(12) United States Patent  
Simpson

(10) Patent No.: US 7,376,671 B2  
(45) Date of Patent: May 20, 2008

(54) METHOD FOR COMMON MANAGEMENT MODEL FOR DISTRIBUTED SERVER NETWORK

(75) Inventor: Franklin Fulton Simpson, New Ipswich, NH (US)

(73) Assignee: BEA Systems, Inc., San Jose, CA (US)

( * ) Notice: Subject to any disclaimer, the term of this patent is extended or adjusted under 35 U.S.C. 154(b) by 626 days.

(21) Appl. No.: 10/823,290

(22) Filed: Apr. 13, 2004

(65) Prior Publication Data

US 2004/0255264 A1 Dec. 16, 2004

Related U.S. Application Data

(60) Provisional application No. 60/462,920, filed on Apr. 15, 2003.

(51) Int. Cl.  
*G06F 17/30* (2006.01)

(52) U.S. Cl. .............. 707/104.1; 707/10; 707/200

(58) Field of Classification Search .............. 707/1, 707/100, 10, 103 R–103 Z, 104.1, 200; 717/140, 717/148; 709/203  
See application file for complete search history.

(56) References Cited

U.S. PATENT DOCUMENTS

| | | | |
|---|---|---|---|
| 6,795,791 B2* | 9/2004 | Gorman | 702/124 |
| 7,165,249 B2 | 1/2007 | Potter et al. | |
| 7,203,697 B2* | 4/2007 | Chang et al. | 707/102 |
| 7,284,039 B2* | 10/2007 | Berkland et al. | 709/219 |
| 2003/0177477 A1 | 9/2003 | Fuchs | |
| 2003/0192031 A1 | 10/2003 | Srinivasan et al. | |
| 2004/0019669 A1 | 1/2004 | Viswanath et al. | |
| 2004/0019670 A1 | 1/2004 | Viswanath | |
| 2004/0230973 A1 | 11/2004 | Cundiff et al. | |

OTHER PUBLICATIONS

Daniel Oberle et al., "Developing and Managing Software Components in an Ontology-Based Application Server", ACM Library, pp. 459-477. 2004.*

Sun Microsystems, Inc., "Java Management Extensions Instrumentation and Agent Specification, v1.1", Final Release, Mar. 2002, pp. 94-95.

* cited by examiner

*Primary Examiner*—Cheryl Lewis  
(74) *Attorney, Agent, or Firm*—Fliesler Meyer LLP

(57) ABSTRACT

Custom management capability is provided through MBeans over a distributed management domain. The management domain is a collection of distributed servers that are managed as a unit, wherein the management system of the present invention presents an API for providing management services across a network. The common management system allows application designers to accomplish a broad range of management goals. The management network is also simple, abstract in that it separates an application author from the implementation, and is scalable. The system of the present invention supports both configuration and monitoring and is Java standards based. The management system is extensible in that a user can add additional types of management objects, schema attributes and extended persistence features.

37 Claims, 4 Drawing Sheets

US 7,376,671 B2

METHOD FOR COMMON MANAGEMENT MODEL FOR DISTRIBUTED SERVER NETWORK

CLAIM TO PRIORITY

The present application claims the benefit of priority under 35 U.S.C. §119(e) to U.S. Provisional Patent Application entitled "METHOD FOR COMMON MANAGEMENT MODEL FOR DISTRIBUTED SERVER NETWORK", Application No. 60/462,920, filed on Apr. 15, 2003, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The present application is related to the following U.S. patents and patent applications, which patents/applications are assigned to the owner of the present invention, and which patents/applications are incorporated by reference herein in their entirety:

U.S. patent application No. 10/823,324, entitled "COMMON MANAGEMENT MODEL FOR DISTRIBUTED SERVER NETWORK," filed on Apr. 13, 2004, currently pending.

FIELD OF THE INVENTION

The current invention relates generally to computer server management, and more particularly to providing an customizable distributed management infrastructure for a server network.

BACKGROUND OF THE INVENTION

Java standards for web services are constantly being developed. Concurrently, businesses are building important applications on top of web services infrastructures, such as that available in WebLogic Server from BEA Systems of San Jose, Calif. As these applications evolve, the web service infrastructures require management capabilities to operate more efficiently and to provide authors of applications with a means for managing and monitoring infrastructure resources and services.

Past management systems have been difficult to use and expose underlying architecture to clients, thereby making application integration more difficult and time consuming. Past management systems have also been designed as proprietary systems that distribute management objects across systems. These proprietary systems have been disadvantageous because they do not track the changes made to MBeans throughout a network.

The applications currently developed do not provide a customized management capability for a server network. What is needed is an application management model that provides customized management capability for a broad range of distributed applications.

SUMMARY OF THE INVENTION

In one embodiment of the present invention, custom management capability is provided through MBeans over a distributed management domain. The management domain is a collection of distributed servers that are managed as a unit. The management system of the present invention presents an API for providing management services across a network. The common management system is flexible in that it allows application designers to accomplish a broad range of management goals. The management network is also simple, abstract in that it separates an application author from the implementation, and is scalable. The system of the present invention supports both configuration and monitoring and is Java standards based. The management system is extensible in that a user can add additional types of management objects, schema attributes and extended persistence features.

DETAILED DESCRIPTION

In one embodiment of the present invention, custom management capability is provided through JMX MBeans over a distributed management domain. The management domain is a collection of server nodes, each with its own MBean server. The management system of the present invention presents an API for providing management services across a network. The common management network is flexible in that it allows application designers to accomplish a broad range of management goals. The management network is also abstract in that it separates an application author from the implementation and is simple and scalable. The system of the present invention supports both configuration and monitoring and is Java standards based. The management system is extensible in that a user may add schema attributes and extended persistence features.

Figure 1:
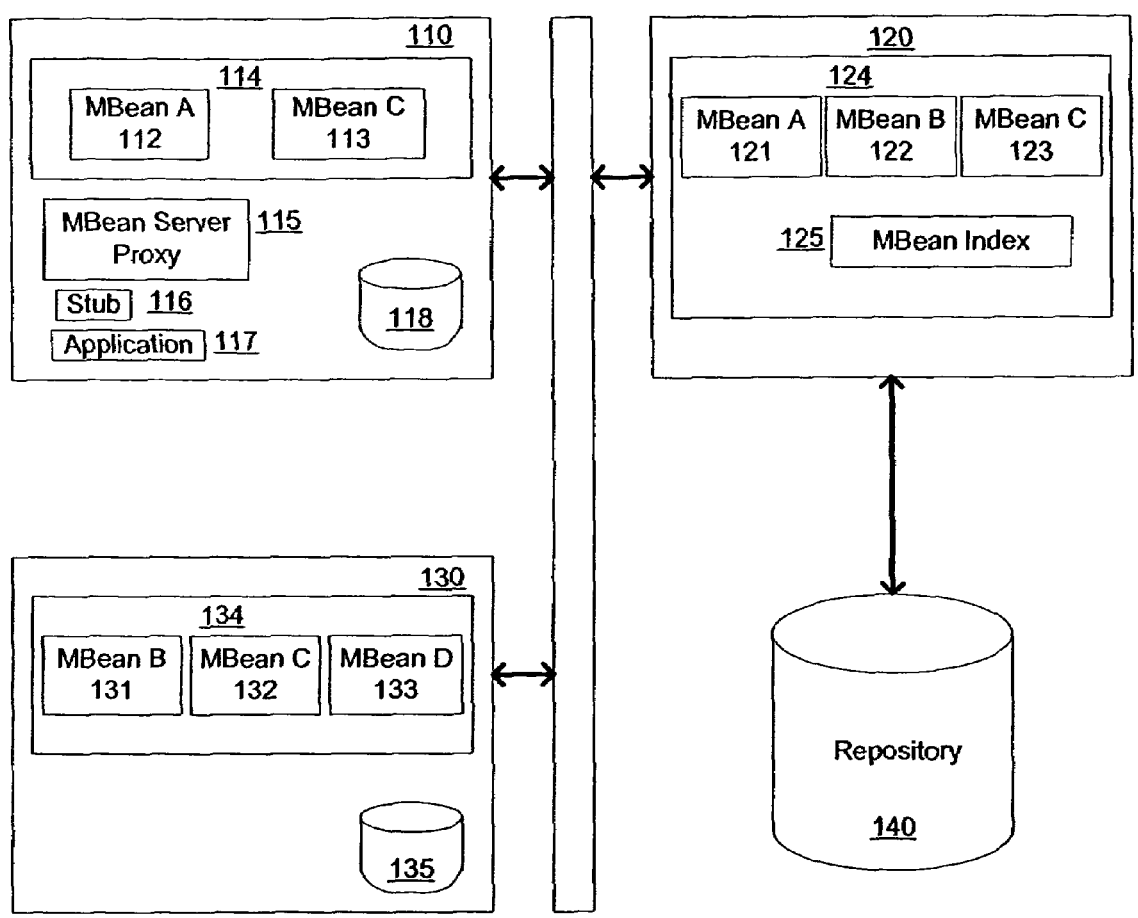
FIG. 1 is an illustration of a common management model server network in accordance with one embodiment of the present invention.

The management system of the present invention is packaged as a framework with multiple MBeans wherein a security provider may extend it. A server network 100 within a management domain in accordance with one embodiment of the present invention is illustrated in FIG. 1. Server network 100 includes managed server 110, managed server 130 and an administration server 120. Though network 100 is pictured with two managed servers 110 and 130, a different number of managed servers is possible to implement a management domain of the present invention. Managed server 110 includes custom MBean A 112 and custom MBean C 113 within MBean server 114, an MBean server proxy 115, a stub 116 for MBean A 112, an application 117, and local repository 118. The MBean server proxy 115 acts as a logical canonical server to wrap the MBean server and serve as an interface for accessing the MBean server. In one embodiment, any server may interface with the canonical server. Though not pictured, all MBeans may include an MBean stub. Managed server 130 includes custom MBean B 131, custom MBean C 132 and custom MBean D 133 within MBean Server 134, and local repository 135. Administration server 120 includes MBean server 124 which includes a copy of all MBeans scoped to the administration server. The administration server may transmit and receive information from repository 140 such as global MBean information. Repository 140 maintains information across the network, subject to persistence policies.

The scope of a custom MBean is the set of locations at which a custom MBean is available. An MBean is not available to servers located outside the MBean's scope. If the scope is a single server, then the MBean is server specific. In this case, applications and servers must go to the particular server to read server specific Mbeans. The administration server does not have a copy of a server specific MBean. Unlike shared MBeans, a server specific MBean is not shareable. In the embodiment shown in FIG. 1, MBeans A, B and C are scoped to the Administration Server and thus shared. MBean D is a server specific MBean and is not scoped to the administration server. Administration server 120 contains a copy of all shareable MBeans located in the management domain in the administration server MBean server. A managed server 110 may contain a copy of MBeans scoped to that managed server. In one embodiment, a managed server may be configured such that all Mbeans residing on the server are stored on the server's local repository in addition to the administration server's repository. In the embodiment illustrated in FIG. 1, the copy of the MBean within the managed server 110 is stored in local repository 118. This redundant managed server MBean copy improves performance and ensures that the managed server is fully manageable if the administration server goes offline. The scope of an MBean can be specified in the MDF. Alternatively, the scope can be provided on a specific instance upon creation. In either case, the scope is stored in the MBean information structure.

In one embodiment, a request for a server specific MBean may be handled by any MBean server in the management domain of the MBean. Accessing a server specific MBean may be done through the logical canonical server corresponding to the managed server that the server specific MBean resides on. If an application requests an MBean not available on an MBean server, a method may be called by the MBean server that returns a list of all custom Mbeans in the management domain, both server specific and otherwise. The application may provide user provided information, such as the provided object name pattern, to further qualify the search. The returned list of objects may contain the name of the MBean and the name of the server each MBean resides on. The method accesses the MBean index in the administration server. The administration server MBean index contains a list of all server specific MBeans in addition to the shared MBeans which are registered in the MBean server. The method call may be configured to return all server specific MBeans in the domain or a specific subset.

Figure 2:
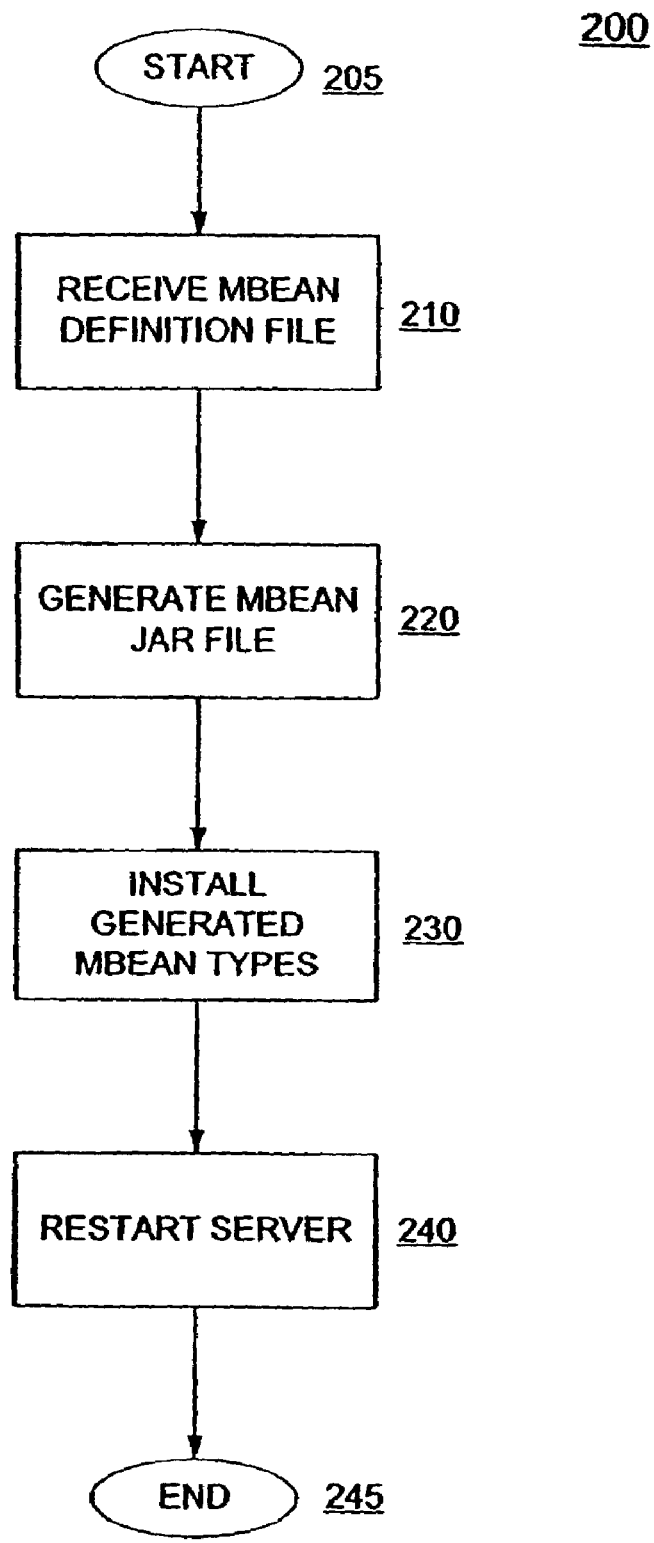
FIG. 2 is an illustration of a method for generating a custom MBean type in accordance with one embodiment of the present invention.

A method 200 for generating a custom MBean type in accordance with one embodiment of the present invention is illustrated in FIG. 2. Method 200 begins with start step 205. An MBean definition file (MDF) is received by the system of the present invention in step 210. In one embodiment, the MDF is received in XML format. In this embodiment, the MDF may include an XML tag for the MBean itself, and a tag for each attribute, operation, and potential notification issued by the MBean. In another embodiment, the MDF is in some other format suitable for describing JMX MBeans.

The MBean definition tag, the attribute definition tag, and operation definition tag may include attributes including name, package, persist policy, persist period, description, and display name. Numerous other attributes may be used in addition to these depending on the use and application of the MBean as understood by those in the field of server management programming. In one embodiment, the only required attribute for each of the definition, attribute, and operation tag is a name attribute. In addition to attributes, the operation definition tag may also contain a sub-tag instance for each argument of the operation. In one embodiment, the only attributes to the sub-tag instance for the argument are name and type, the latter providing the data type of the argument. A notification definition tag may include attributes including name, severity, display name, among others. Numerous other attributes may be used in addition to these depending on the use and application of the MBean.

Once the MDF file is received, an MBean .jar file (MJF) is generated in step 220. The MJF is generated from the MDF received in step 210. The MJF contains a file or set of files that comprise data needed to install one or more MBean types into a web service infrastructure. Generating an MJF is discussed in more detail with respect to FIG. 3.

The generated MBean types are then installed into a managed server within the management system in step 230 of method 200. In one embodiment, this includes placing the MJF in a predetermined directory within the managed server it is to reside in, such as an MBean type directory. Next, the server is started at step 240. Starting the server initiates a loading process for MBean types. The loading process includes resolution of external references to other MBean types and validation of the type. Operation of method 200 then ends at step 245. After the server has started up successfully, the MBean types are fully installed into the running server located within the web service infrastructure and MBean instances can be created. Server start-up can be performed immediately after installation of the generated MBean types or sometime later, such as after other tasks have been performed.

Upon start-up, a managed server establishes a connection with the administration server and synchronizes it's local MBean cache with the values in the administration server. As changes occur during the session, the changes are propagated from the administration server to all scoped servers.

Figure 3:
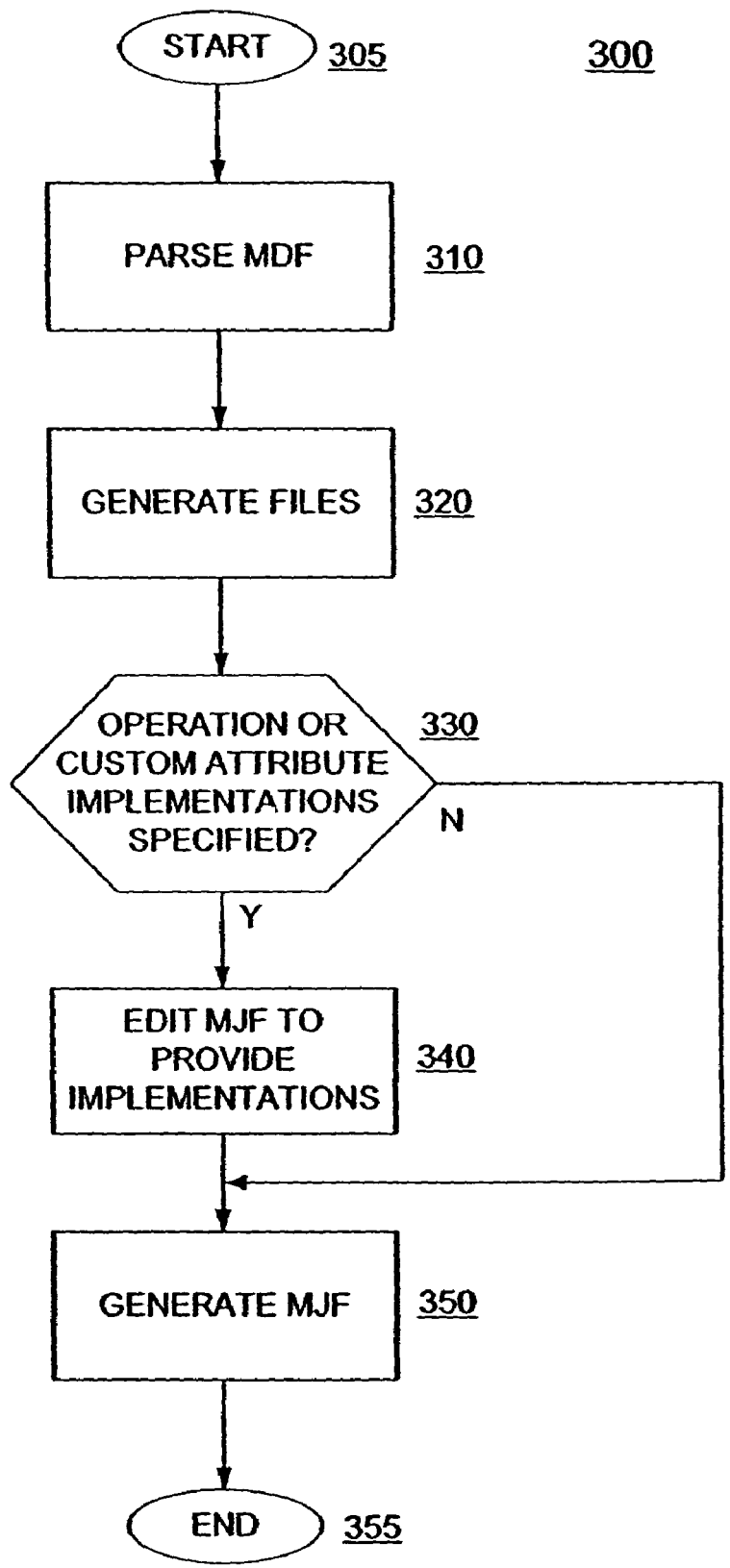
FIG. 3 is an illustration of a method for generating a .jar file in accordance with one embodiment of the present invention.

FIG. 3 illustrates a method 300 for generating an MJF in accordance with one embodiment of the present invention. Method 300 begins with start step 305. Next, a received MDF file is parsed at step 310. In one embodiment, the received MDF file is in XML format. At step 320, files are created from the parsed MDF file. The MJF contains a set of files that together comprise data needed to install the represented MBeans into the management domain of the server network. In one embodiment, these files include class and source files. The generated files may include, for each contained type, a file with a serialized version of MBean type, a source file with one or more method stubs, and an interface file. The files may then compiled and stored in a .jar file.

Next, the system determines if any operations or custom attribute implementations are specified for the MBean at step 330. If no operations or custom attributes are specified, operation continues to step 350. If operations or custom attributes are specified, then operation continues to step 340. At step 340, the set of files is configured to provide the specified implementations. Configuring the files may include editing the files created in step 320. The files may be edited by a user or application or in some other manner. In another embodiment, the user or application modifies the method stubs created at step 320.

After the specified implementations are configured in step 340, the files are compiled and stored in a .jar file in step 350, thereby completing generation of the MJF. Operation of method 300 then ends at step 355. Method 300 may be repeated for additional MDFs. In this manner, an MJF may contain multiple MBeans and reference MBean types in other .jar files. As discussed above in reference to method 200, the MJF may be stored at a pre-determined location within the management network.

Figure 4:
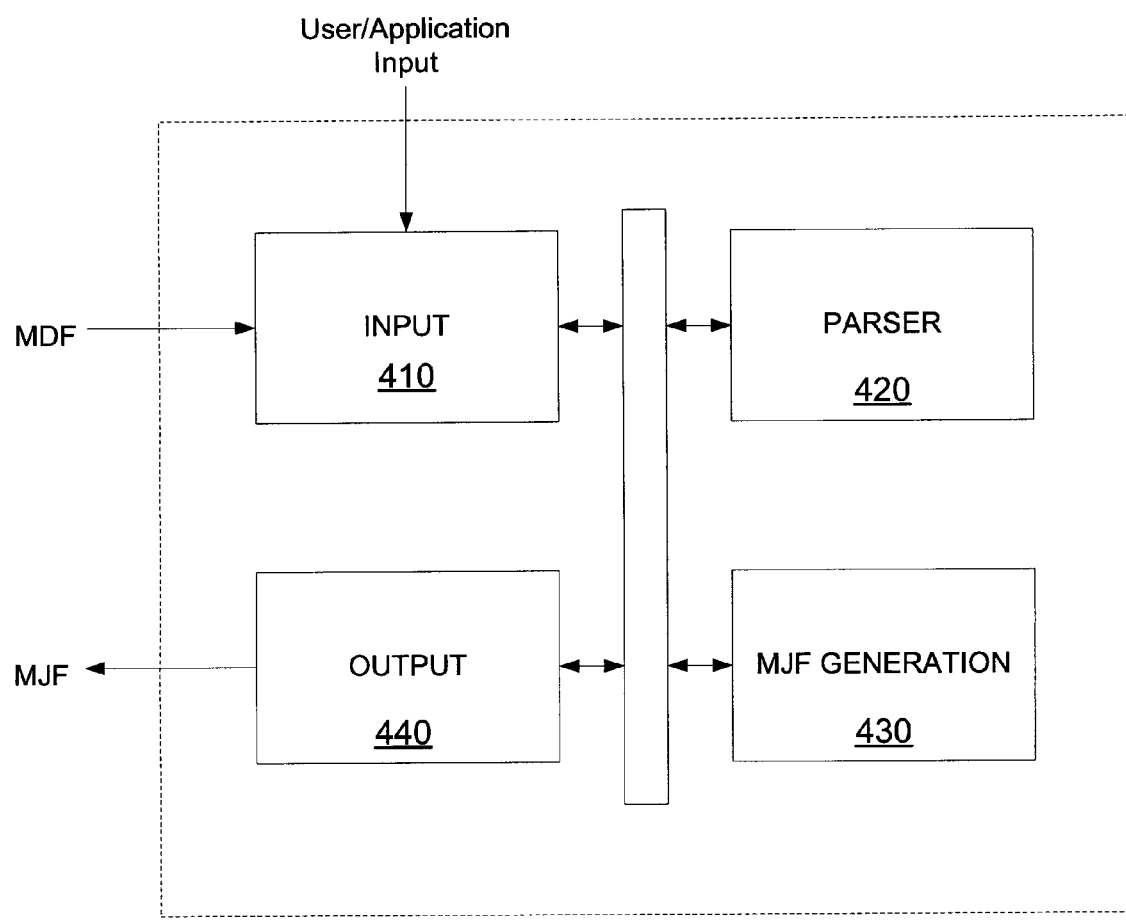
FIG. 4 is an illustration of a block diagram of an MBean Generation Tool in accordance with one embodiment of the present invention.

FIG. 4 illustrates an MBean generation tool 400 in accordance with one embodiment of the present invention which may be used to generate MBean files and to perform the method illustrated in 300. The components of the MBean Generation Tool may be implemented as code such as Java. MBean generation tool 400 includes input 410, parser 420, MJF generation 430, and output 440. In operation, an MDF may be received by input 410. In one embodiment, a user may input any of the MDF name, MDF location, MJF name, and MJF location, and specify certain preferences. The preferences may include a particular location to store the intermediate files to be included in the MJF before MJF generation and whether or not to include source files in the MJF. Parser 420 will parse the received MDF and generate the class files. MJF Generation block 430 will generate the MJF from the files generated by the parser. Additionally, if the files are modified by a user, the modified files will then be included in the generated MJF.

The MBean generation tool may be implemented as a command line tool, a graphical user interface or in some other manner. When implemented as a command line tool, the following command may be used to generate the MBean files of an MJF:

java MBeanMaker -MDF=<xmlfile>
   -MJF=<jarfile>
   -files=<filesdir>
   -includesource=<Boolean>

The input file <xmlfile> is the XML MBean description file, or MDF file. In the case where the MBean contains operations or custom attribute accessor method implementations, the MBean generation tool creates a set of files. In one embodiment, if a new MDF file is received while output files for that MBean type already exist, a new set of output files is created that overwrite the previous ones. The MJF location for the output files is specified above by <jarfile>. Upon creation, the MJF is saved with the specified name. If an MJF already exists with the specified name, the MBeans are added to it. If the MBean files being processed already exists in an existing MJF, then user confirmation is required in order to replace them. The files=<filesdir> provides an intermediate location to write the intermediate files that will ultimately make up the MJF. In one embodiment, this option is used when the custom MBean contains operations or custom attribute accessor method implementations. When -files is used, source files are generated and the appropriate method stubs are left for modification. Upon any modification of the method stubs, the final MJF is generated. In one embodiment, a user or application may modify the stubs. After any files have been modified, the MBean generation tool creates the MJF from the generated files. The source files may be included in to the resulting MJF. This option may be utilized with the -includesource=<Boolean> statement above. In one embodiment, the source files may include generated Java source files and the MDF itself. The MBean generation tool may be run multiple times with respect to one MJF to include multiple Mbeans in the same MJF.

In one embodiment, when operations or custom attributes are present, the files generated include the source for the custom MBean implementation class, the source for the MBean interface class, and a set of resource bundles as defined in the MDF. When operations or custom attributes are not present, the generated MJF contains a class file for implementing the MBean, a class file for the MBean interface, a serialized version of the MBI for instances of the type, and a set of resource bundles as defined in the MDF. A parameter such as -includesource=<Boolean> may be used to specify whether the MJF will contain the MBean source. In this case, the MJF will contain a set of files including a class file for implementing the MBean, a class file for the MBean interface (MBI), a serialized version of the MBI for instances of the type, a set of resource bundles as defined in the MDF, the MDF, the source for the custom MBean implementation class, and the source for the MBean interface class. The MJF will also contain any supplemental files which the users placed in the same directory as the files generated in step 320 of process 300.

Generally, the local MBean server handles read attribute requests and MBean creation and deletion requests for server specific MBeans. The administration server handles attribute writes and MBean creation and deletion requests for sharable MBeans. Accordingly, the MBean Server Proxy routes read access to the appropriate server and MBean instance within that server and routes write accesses to the corresponding MBean instance on the administration server.

Custom MBeans may be accessed through typed MBean stubs. An MBean stub is a higher level method provided by the management system of the present invention. In one embodiment of the present invention, an MBean stub provides a reference to a Java object, where the java object implements an interface that is specific to a custom MBean. Thus, a stub provides a user with a reference to a custom MBean interface, thereby effectively providing direct access to attributes and operations of the custom MBean in a type-safe manner. The interface is represented as a class file in the MJF. All MBeans created with the MBean generation tool have the static interface and may be accessed through typed stubs. Stubs may be generated dynamically at runtime.

In one embodiment, a factory model is provided for creating MBean instances. This is a higher level method for creating an MBean as provided by the management system of the present invention. An application may call a create MBean method defined by the management system of the present invention, passing the object name of the MBean type and the object name of the new instance. In another embodiment, the application may call an invoke method on the logical canonical MBean server. The object of the invoke is the MBean which represents the MBean type (MTM), and the operation being invoked on the MTM is a create MBean method. A user may also create an MBean through JMX by using the standard MBean server functions on the canonical MBean server.

Generally, an MBean in the management network of the present invention has a single network identity. Though a single identity throughout the network satisfies most applications, some applications may require enhanced isolation levels for MBean data. For example, an application may wish to make changes that affect only the current session and not subsequent sessions, or vice versa. Applications requiring this type of MBean isolation can be served using an MBean delegate.

MBean delegates are derived from an existing MBean, considered the delegate's prototype. At creation, a delegate is identical to the prototype. After creation, the delegate may be changed directly. If the prototype is changed after creation of the delegate, the delegate is automatically updated with the change unless the modified value has been specifically altered in the delegate. A delegate has identical attributes and operations, or schema, as its prototype, is restricted to being within a subset of the scope of its prototype, and qualifies for persistence and caching.

In an embodiment where a user generates custom MBean types using the MBean generation tool, delegate objects are automatically generated. If the MBean is declared to be persistent upon registration, the MBean is automatically saved to the repository. Once registered, the MBean is available to all servers it is scoped to. If the MBean is configured to be persistent, the MBean is available in subsequent sessions until it is deleted. The MBean may be accessed using standard JMX or using typed stubs.

The JMX model MBean standard defines the model through which persistence occurs. An application may use this model to define the policy for persistence. In this manner, a single managed resource exists that is manageable from any implementation of a model MBean and the storage strategy for a given MBean implementation is free to change over time as requirements evolve. As MBeans within the management system of the present invention are based on policy-based model MBeans, MBeans may or may not be persistent because the model MBean includes tags specified for the MBean to indicate whether the MBean is persistent. According to the specified policy, a persistent MBean can be persisted whenever it is modified, or persistence can occur based on specified timing values.

In one embodiment, persistence system includes file format features such that the format used for each file is a data structure containing a list of name/value pairs representing the attribute values and a list of name/value pairs representing metadata elements. The data is written into the repository using java serialization. Serialization may involve schema evolution. Attribute additions are handled by adding the new attribute to the type. When the MBean is read from persistence, it is reinstated with the new attribute. The values are the values specified in the type definition. An attribute is discarded when an MBean that is read from persistence contains an attribute name in it list which is not in the schema for that type of MBean.

In some applications, a complex structure of MBeans may be required. The structures may be supported by allowing a user to reference one MBean from another. Referencing MBeans may be done in several ways. In one embodiment, an MBean may be referenced by object name. In this embodiment, the object name of the MBean to be referenced is stored as an attribute value in the referencing MBean. Either the string or object name can be used for this purpose. This embodiment allows for simple, completely JMX compliant references from and to custom MBeans to any other type of MBean.

In another embodiment, the referencing may be achieved using a relation service. The relation service allows users to define relation types, domains, and to create instances of a relation by adding MBean instances into supported roles of the relation. JMX MBean servers provide an implementation of the relation service. This embodiment provides a referencing mechanism that is JMX compliant, provides referencing to and from custom MBeans to any other type of MBean, has type support and referential integrity, is visible to generic tools, and is useful for modeling complex relationships between MBeans.

In another embodiment, a typed mechanism may be used for referencing between custom MBeans when using stubs. To enable the mechanism, an attribute is defined to be of a type that corresponds to another custom MBean type of the present, invention. The attribute is to act as a reference to another MBean. In one embodiment, the type name may also be specified as the value of a MDF field indicating the interface type. At runtime, when the defined attribute is accessed through a stub of the management network of the present invention, the management network returns another stub for the returned MBean. Similarly, when the value of the defined attribute is set through a stub, it is set with a value that is another stub of the provided type. This mechanism allows stub users to transparently move from one MBean to another. In one embodiment, the stored value of the defined attribute is the object name of the referenced MBean. The typed mechanism embodiment provides type support, is visible to generic tools, provides simple and direct reference traversing, and prevents the value from being set to an invalid type of MBean.

As described above, the management infrastructure of the present invention consists of custom MBeans. In one embodiment of the present invention, the JMX standard Model MBean is used as the basis for a custom MBean. A model MBean is a generic MBean that is capable of providing certain services such as persistence and caching. The standard approach for using a model MBean is to instantiate the model MBean class and to populate it with the information required to drive it. In one embodiment, the information includes the MBean information structure, implementation behaviors and notification handlers. The implementation behaviors can be provided either directly by the model MBean class or using a separate delegate object. The MBean information provides the list of attributes and operations supported and a list of potential notifications issued by the MBean. Specific attribute values may also be stored as MBean information. Behavior methods must exist for all operations and for any attributes that have custom accessor methods. When using the MBean Generation Tool, behaviors are provided using a delegate object. The source file for the delegate object is automatically generated, but must be edited by the user A factory model can be used to generate the model MBean instances at runtime. The model MBean of the present management infrastructure is a subclass of the RequiredModelMBean, which is the default model MBean for the MBean server. In addition to supporting the standard model MBean capabilities, a number of extensions are provided in the model MBean implementation of the present invention. These extensions are provided in a standard way by adding tags to the descriptor elements of the standard ModelMBeanInfo structure.

In one embodiment, each custom MBean is stored in a separate file and is shadowed for failsafe writes. This allows a scaleable system for large sets of MBeans in that it does not access a file containing all MBeans upon updating a single MBean. Each MBean has an object name that includes the domain name. In one embodiment, MBeans with the same domain name are stored in the same directory. In another embodiment, users may specify alternate locations for the MBean storage.

In one embodiment, an MBean instance is stored as a directory containing up to two files. The directory name and its contained files are simple integer values. The files in the directory represent up to two versions of the MBean. Each time the MBean is written, a counter for the particular MBean is incremented and the new counter value is used as the filename for the version being written. Once the write operation is completed, the MBean is re-read to insure it was not corrupted during the write. After being re-read, all lower numbered files are deleted. Upon start-up, the lower numbered file is used and the higher one deleted, and the counter is set to the value of the file that was used.

In one embodiment, the management system of the present invention automatically saves the state of configuration when a server successfully boots. In this embodiment, the system may reboot the server using the saved configuration state if it cannot be successfully rebooted later. The files used for the boot are renamed after the boot successfully completes. The renamed files are protected from deletion during the current session. They are deleted only after a subsequent successful boot. If a subsequent boot is not successful, a user may request that the backup configuration files be used in the current boot.

In one embodiment, for each custom MBean type installed into the infrastructure of the present invention, a special MBean is created called an MBean type MBean (MTM), representing the type of custom MBean. In addition, one can have type hierarchies of MBeans. In one embodiment, an MBean can derive from any number of MBeans. Schema may be inherited completely from parent Mbeans. However, custom logic from parent Mbeans may only be inherited from one parent. Applications can query the instances of the MTM to obtain a list of custom MBean types. An MTM, being a custom MBean itself, also has an MTM representing its type. The MTM for all MTMs is the MBean type type MBean (MTTM). The existence of the MTTM provides a JMX standard interface to the factory model for the creation of new custom MBean types at runtime. Attributes for the MTM may include instance information, expanded MBean instance information, delegate class, delegate class name, interface class, interface class name, a user defined string, a Boolean abstract type, and a vector indicating a list of all instances by object name. Type MBeans are managed as MBeans and may be used to instantiate, get information, and request notification on a type.

In one embodiment, migration of MBean meta-data information or schema may be provided depending on the circumstances of the MBean. If there is an existing MBean instance and the type has changed with an added attribute or operation not included in the type when loaded, the management system of the present invention adds it and affixes a default value. The instance is updated upon start up of a managed server that includes the instance. If an attribute or operation is in an instance but not in the schema, the management system assumes a user deleted it and removes it from the type. If there is a change to an attribute's data type within an MBean type, an operation can be provided that transforms from one type to another. Upon loading, if the management system notices the type is different, the system will look for a standard conversion method. If found, the system will call the conversion method to do a translation.

In one embodiment, factory methods may be used as operations to instantiate the MBean type and register the new MBean instance. The methods take the object name of the new instance and then create and register the MBean under the provided name and return a JMX defined object that contains the object name and class name for the model MBean. When a new instance of an existing type is created, a notification is issued.

The basis for custom MBean support in the management network of the present invention is the use of JMX model MBeans. The management system of the present invention provides an implementation of a JMX standard Model MBean. The provided model MBean class provides the standard Model MBean features along with additional extensions. Management infrastructure MBeans are created by instantiating the JMX standard Model MBean class, and then populating the class with information that describes the MBean. The information provided includes descriptions and user messages and internationalization of these, the persistence policy, the caching policy, attribute sets and their implementations, operations and their implementations, notifications that the MBean can issue, and the scope of the MBean.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

What is claimed is:

1. A computer implemented method for generating a custom MBean, comprising:
    receiving an MBean definition file in XML format;
    generating an MBean jar file from the MBean definition file, wherein the MBean jar file includes a tag for the MBean and a tag for each attribute, operation, and potential notification issued by the MBean; and
    placing the jar file in a predetermined directory within a managed server in a management domain; and
    wherein an administration server handles attribute writes and MBean creation and deletion requests for sharable MBeans; and
    wherein said generating the MBean jar file from the MBean definition file further comprises:
        parsing the MBean definition file;
        generating files from the parsed MBean definition file; and
        compiling and storing the generated files in the MBean jar file.

2. The method of claim 1, wherein the tag for each attribute includes name, package, persist policy, persist period, description, and display name.

3. The method of claim 1, wherein the operation definition tag includes a sub-tag instance for each argument of the operation.

4. The method of claim 3, wherein attributes for the sub-tag instance are name and type.

5. The method of claim 1, wherein a notification definition tag includes name, severity, and display name.

6. The method of claim 1, wherein a local MBean server handles read attribute requests and MBean creation and deletion requests for server specific MBeans.

7. The method of claim 6, wherein an MBean Server Proxy routes read access to an appropriate server and MBean instance within the appropriate server and routes write accesses to the corresponding MBean instance on the administration server.

8. The method of claim 1, wherein a custom MBean is accessed through a type MBean stub.

9. The method of claim 8, wherein an MBean stub provides a reference to a java object which implements an interface specific to the custom MBean.

10. The method of claim 9, wherein stubs are generated dynamically at runtime.

11. The method of claim 1, wherein a factory model is provided for creating MBean instances.

12. The method of claim 1, wherein MBean delegates are derived from an existing MBean.

13. The method of claim 1, wherein MBeans that are declared to be persistent are automatically saved to a repository.

14. The method of claim 1, wherein each custom MBean is stored in a separate file and is shadowed for failsafe writes.

15. A computer implemented method for generating a custom MBean, comprising:
    receiving an MBean definition file in XML format;
    generating an MBean jar file from the MBean definition file, wherein the MBean jar file includes a tag for the MBean and a tag for each attribute, operation, and potential notification issued by the MBean; and
    placing the jar file in a predetermined directory within a managed server in a management domain, wherein scope of a custom MBean is a set of locations at which the custom MBean is available, and wherein an administration server contains a copy of all sharable MBeans located in a management; and
    wherein said generating the MBean jar file from the MBean definition file further comprises:
        parsing the MBean definition file;
        generating files from the parsed MBean definition file; and
        compiling and storing the generated files in the MBean jar file.

16. The method of claim 15, wherein changes to an MBean are propagated from an administration server to all servers within the scope of the MBean.

17. The method of claim 15, wherein applications and servers must go to a particular server to read a server-specific MBean.

18. The method of claim 15, wherein all MBeans residing on a managed server are stored in the managed server's local repository in addition to the administration server's repository.

19. The method of claim 15, wherein the scope is specified in the MBean definition file.

20. The method of claim 15, wherein the scope is specified for a specific instance upon creation.

21. The method of claim 15, wherein the scope is stored in the MBean information structure.

22. The method of claim 15, wherein a request for a server specific MBean may be handled by any MBean sewer in the management domain of the MBean.

23. The method of claim 15, wherein accessing a server specific MBean is performed through a logical canonical server corresponding to a managed sewer that the server specific MBean resides upon.

24. A computer implemented method for generating a custom MBean, comprising:
    receiving an MBean definition file in XML format;
    generating an MBean jar file from the MBean definition file, wherein the MBean jar file includes a tag for the MBean and a tag for each attribute, operation, and potential notification issued by the MBean; and
    placing the jar file in a predetermined directory within a managed server in a management domain; and wherein when a request is received for an MBean not available on a MBean server, the MBean server calls a method that returns a list of custom MBeans in the management domain; and
    wherein said generating the MBean jar file from the MBean definition file further comprises:
        parsing the MBean definition file:
        generating files from the parsed MBean definition file; and
        compiling and storing the generated files in the MBean jar file.

25. The method of claim 24, wherein the MBean sewer uses user-provided information including a provided object name pattern to qualify a search of the list of custom MBeans in the management domain.

26. The method of claim 24, wherein the returned list of custom MBeans contains a name of a MBean and a name of a server each MBean resides upon.

27. The method of claim 24, wherein an administration server contains a list of server specific MBeans in addition to shared MBeans.

28. The method of claim 27, wherein the call to return a list of custom MBeans is configured to return all server specific MBeans in a management domain or a specific subset.

29. A computer implemented method for providing a custom management capability over a management domain, comprising:

receiving an MBean definition file in XML format;

generating an MBean jar file from the MBean definition file, wherein the MBean jar file includes a tag for the MBean and a tag for each attribute, operation, and potential notification issued by the MBean; and placing the jar file in a predetermined directory within a managed server in the management domain; and providing a custom management capability through the MBean over the management domain, wherein an administration server handles attribute writes and MBean creation and deletion requests for sharable MBeans; and wherein said generating the MBean jar file from the MBean definition file further comprises:

parsing the MBean definition file;

generating files from the parsed MBean definition file; and compiling and storing the generated files in the MBean jar file.

30. The method of claim 29, wherein the management domain is a collection of distributed servers that are managed as a unit.

31. The method of claim 29, wherein the custom management capability tracks changes to MBeans throughout the management domain.

32. The method of claim 29, wherein each server node has a MBean server.

33. The method of claim 29, wherein the custom management capability provides an API for providing management services in the management domain.

34. The method of claim 29, wherein the custom management capability can be customized by a user by adding schema attributes and extended persistence features.

35. The method of claim 29, wherein the custom management capability is packaged as a framework with multiple MBeans which a security provider can extend.

36. A computer implemented method for providing a custom management capability over a management domain, comprising:

receiving an MBean definition file in XML format;

generating an MBean jar file from the MBean definition file, wherein the MBean jar file includes a tag for the MBean and a tag for each attribute, operation, and potential notification issued by the MBean;

placing the jar file in a predetermined directory within a managed server in a management domain; and providing a custom management capability through the MBean over the management domain, wherein scope of a MBean is a set of locations at which the MBean is available, and wherein an administration server contains a copy of all sharable Mbeans located in a management domain; and wherein said generating the MBean jar file from the MBean definition file further comprises:

parsing the MBean definition file;

generating files from the parsed MBean definition file; and compiling and storing the generated files in the MBean jar file.

37. A computer implemented method for providing a custom management capability over a management domain, comprising:

receiving an MBean definition file in XML format;

generating an MBean jar file from the MBean definition file, wherein the MBean jar file includes a tag for the MBean and a tag for each attribute, operation, and potential notification issued by the MBean; and placing the jar file in a predetermined directory within a managed server in a management domain; and providing a custom management capability through the MBean over the management domain, wherein when a request is received for an MBean not available on a MBean server, the MBean server calls a method that returns a list of MBeans in the management domain; and wherein said generating the MBean jar file from the MBean definition file further comprises:

parsing the MBean definition file;

generating files from the parsed MBean definition file; and compiling and storing the generated files in the MBean jar file.

* * * * *

UNITED STATES PATENT AND TRADEMARK OFFICE
CERTIFICATE OF CORRECTION

| | | |
|---|---|---|
| PATENT NO. | : 7,376,671 B2 | Page 1 of 1 |
| APPLICATION NO. | : 10/823290 | |
| DATED | : May 20, 2008 | |
| INVENTOR(S) | : Simpson | |

It is certified that error appears in the above-identified patent and that said Letters Patent is hereby corrected as shown below:

Drawing sheet 2 of 4, in Figure 2, Ref. numeral 220, line 2, delete "JAR" and insert -- .JAR --, therefor.

In column 8, line 45, after "user" insert -- . --.

In column 11, line 6, in claim 1, delete "MBean,comprising:" and insert -- MBean, comprising: --, therefor.

In column 12, line 3, in claim 15, delete "management;" and insert -- management domain; --, therefor.

In column 12, line 28, in claim 22, delete "sewer" and insert -- server --, therefor.

In column 12, line 32, in claim 23, delete "sewer" and insert -- server --, therefor.

In column 12, line 49, in claim 24, delete "file:" and insert -- file; --, therefor.

In column 12, line 54, in claim 25, delete "sewer" and insert -- server --, therefor.

Signed and Sealed this

Ninth Day of February, 2010

David J. Kappos
*Director of the United States Patent and Trademark Office*